3,335,132
AZIRIDINIUM NITROPHENOLATES
Stephen J. Kuhn, Sarnia, Ontario, Canada, assignor to The Dow Chemical Company, Midland, Mich., a corporation of Delaware
No Drawing. Filed Oct. 7, 1964, Ser. No. 402,331
6 Claims. (Cl. 260—239)

This invention relates to new compounds which are the aziridine salts of certain nitrophenols. They may be represented by the formula

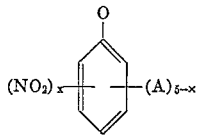 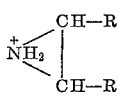

wherein $x$ is an integer 1–2, R is H or an inert radical, such as alkyl or phenyl and each A is H or an inert radical, such as alkyl or halogen.

According to the known art, phenols readily react with aziridines to open the aziridine ring. Phenol itself is thus etherified to produce 2-aminoalkyl phenyl ethers in addition to polymers of the aziridine. o-, m- and p-Nitrophenols do not form ethers but catalyze ring-opening and polymerization of the aziridine [L. B. Clapp, J. Am. Chem. Soc., 73, 2584 (1951)]. Aziridines have been reacted with picric acid to produce crystalline salts, the picryl group being said to be analogous to an acyl group. These salts are easily hydrolyzed, alcoholyzed or rearranged to N-(2-hydroxyalkyl)picramides (L. B. Clapp et al., J. Am. Chem. Soc., 77, 5116 (1955)). It thus appears from the prior art that a phenol and an aziridine can react in any of three ways:

(1) The phenol can directly attack the aziridine, opening the ring and forming a 2-aminoalkyl ether of the phenol (e.g., phenol itself).

(2) Polymerization of the aziridine may be catalyzed, even though no phenyl ether is formed (e.g. mononitro- and monohalophenols as taught by Clapp).

(3) An aziridinium phenolate may be formed as a stable salt (e.g. picric acid).

Prior to the present invention, no phenol other than picric acid, which is a most unusual and atypical phenol, was known to form a stable salt with an aziridine. By "stable" salt is meant one capable of isolation and existence at ordinary temperatures.

According to the present invention, stable, crystalline aziridinium nitrophenolates are made by contacting an aziridine having an unsubstituted ring nitrogen atom with a nitrophenol in an inert, anhydrous solvent at a temperature below that at which the salt decomposes or the aziridine polymerizes. Suitable such temperatures are —20 to 30° C., though high temperatures, even up to 100° can be used with the more stable salts.

Suitable solvents include the aliphatic and aromatic hydrocarbons and ethers, such as benzene, toluene, xylene, hexane, octane, petroleum ether, diethyl ether, dibutyl ether, tetrahydrofuran and the like.

Suitable aziridines are those having no substituent in the 1-position and only inert substituents in the 2- and/or 3-position, thus including aziridine itself as well as 2-alkylaziridines, such as 2-methylaziridine, 2-ethylaziridine and the isomeric 2-butylaziridines, 2-phenylaziridine, 2-methyl-3-phenylaziridine, 2,3-dimethylaziridine and 2-methyl-3-butylaziridine. Preferably, any substituents contain no more than 6 carbon atoms.

Suitable phenols are those having at least one nitro group attached to the aromatic ring bearing a phenolic hydroxyl group. Other substituents may also be present on the ring so long as they are inert toward aziridine under the conditions of the process. Examples of suitable phenols include o-, m- and p-nitrophenol; the various isomeric nitrocresols; the nitrohalophenols, such as the nitrochlorophenols, the nitrobromophenols, the nitrochlorocresols and the nitrobromocresols; the dinitrophenols, such as 3,5-, 2,4-, 2,5- and 2,6-dinitrophenol; the corresponding dinitrocresols; the dinitrohalophenols, such as 2- chloro- and 2-bromo-3,5-dinitrophenol, 4-chloro- and 4-bromo-3,5-dinitrophenol, 2,6-dichloro-3,5-dinitrophenol and 3,5-dibromo-2,4-dinitrophenol; and, in general any nitrophenol having one or two nitro groups and no other substituent reactive with aziridine. Non-reactive substituents include alkyl and aryl, particularly phenyl groups, preferably containing no more than 6 carbon atoms each and halogens, especially chlorine and bromine.

The practice of the invention is illustrated by the following examples.

*General procedure*

A solution of 0.2 mole of the nitrophenol in 500 ml. of ether was stirred and maintained at room temperature (25° C.) while 0.2 mole of the aziridine, optionally dissolved in ether, was slowly added. The crystalline salt precipitated as formed and was separated by filtration. A small amount of product could be recovered by evaporation of the filtrate. The products were highly colored crystals which were stable at room temperature, and in most cases, up to their melting points. The free aziridine could be recovered from the salts by treatment with alkali. Table I lists some typical salts prepared by the above procedure.

TABLE I

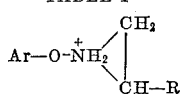

| Example No. | Ar | R | M.P., °C. | Yield Percent | N Percent Found | N Percent Calc'd |
|---|---|---|---|---|---|---|
| 1 | 2,4-dinitrophenyl | H | 111–113 | 95 | 18.56 | 18.50 |
| 2 | ---do--- | CH₃ | 97–99 | 96 | 17.50 | 17.42 |
| 3 | 2-methyl-4,6-dinitrophenyl | H | 98–99 | 95 | 17.70 | 17.65 |
| 4 | ---do--- | CH₃ | 93–94 | 95 | 16.39 | 16.47 |
| 5 | 2,6-dichloro-4-nitrophenyl | H | 110–112 | 94 | 11.15 | 11.20 |
| 6 | ---do--- | CH₃ | 96.98 | 95 | 10.61 | 10.56 |
| 7 | 2-nitro-3,4,5-trichlorophenyl | H | 106.107 | 98 | 9.80 | 9.80 |
| 8 | ---do--- | CH₃ | 99.101 | 97 | 9.43 | 9.49 |
| 9 | 2-nitrophenyl | H | 108–110 | 89 | 15.34 | 15.38 |

The compounds of the invention are useful as stable, non-volatile sources of the aziridine component. They are also useful as pesticides. As herbicides, the compounds of Examples 1, 3, 5 and 7 killed substantially 100 percent of crabgrass and radish while aziridinium picrate at the same concentrations (0.4 percent and 0.005 percent on radish and crabgrass, respectively) showed substantially zero kill. Similarly, in the control of water weeds, the compound of Example 7, at a concentration of 10 parts per million, showed 100 percent kill of Elodea and Cabomba and 90 percent kill of milfoil while aziridinium picrate showed zero kill on all three weeds at the same concentration. As insecticides, when applied to two-spotted spider mites in a concentration of 0.05 percent, the compounds of Examples 1, 2, 4 and 7 effected substantially 100 percent kill while aziridinium picrate in the same test showed zero kill. As fish poisons, the compounds of Examples 3 and 4 killed 100 percent of goldfish at a concentration of 2 parts per million while aziridinium picrate in the same test killed 0 percent.

I claim:

1. An aziridinium nitrophenolate having the formula

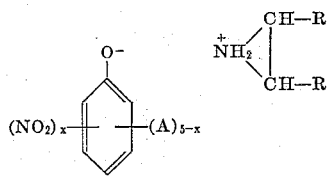

wherein $x$ is an integer 1–2, each R is an inert radical selected from the group consisting of H, alkyl and aryl radicals containing up to 6 carbon atoms and each A is a radical selected from the group consisting of H, halogen, aryl and alkyl radicals containing up to 6 carbon atoms.

2. An aziridinium nitrophenolate having the formula

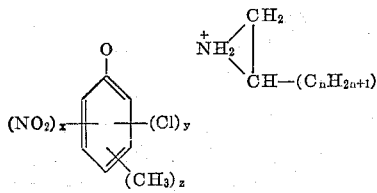

wherein $x$ is an integer 1–2, $y$ is an integer 0–3 and $n$ and $z$ are integers 0–1.

3. The process for making a crystalline aziridinium nitrophenolate comprising reacting by contacting at a temperature below the decomposition point of the nitrophenolate and in an inert anhydrous solvent, a nitrophenol of the formula

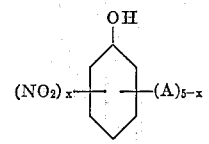

wherein $x$ is an integer 1–2 and A is H, halogen, aryl or alkyl and contains not more than 6 carbon atoms, with an aziridine having the formula

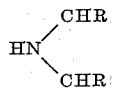

wherein each R is H or an inert alkyl or aryl radical and contains not more than 6 carbon atoms.

4. The process of claim 3 wherein the nitrophenol has the formula

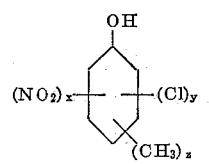

wherein $x$, $y$ and $z$ are integers, $x$ being 1–2, $y$ being 0–3 and $z$ being 0–1.

5. The process of claim 3 wherein the reaction temperature is −20 to 100° C.

6. The process of claim 3 wherein ether is used as a reaction solvent.

References Cited

UNITED STATES PATENTS

| | | | |
|---|---|---|---|
| 2,210,945 | 8/1940 | Mills | 260—622 |
| 2,410,281 | 10/1946 | Fletcher et al. | 260—622 |

OTHER REFERENCES

Braude et al.: Determination of Organic Structures by Physical Methods (New York, 1955), pages 589–596.

Frear, Chemistry of the Pesticides (New York, 1955), pages 384–385.

Schatz et al.: J. Am. Chem. Soc., vol. 77, pages 5113–5118 (1955).

ALEX MAZEL, *Primary Examiner.*

ALTON D. ROLLINS, *Examiner.*